Oct. 22, 1957 — C. E. ANDERSON — 2,810,538
DOUBLE-THREAD HANGER CLAMP
Filed Jan. 8, 1954
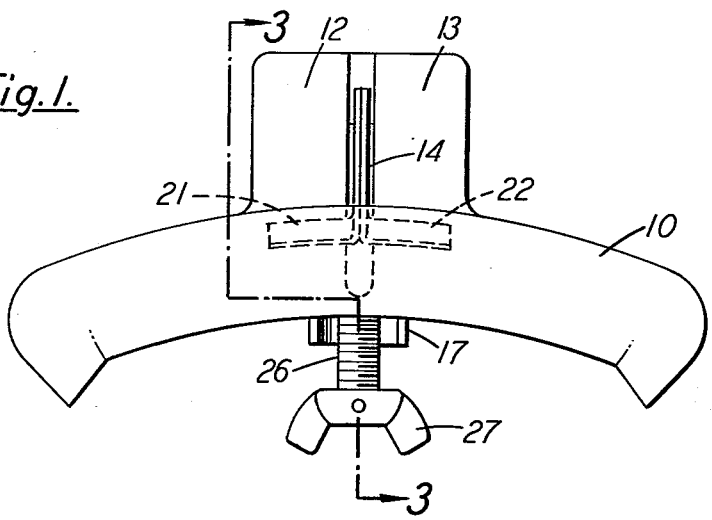
Fig. 1.
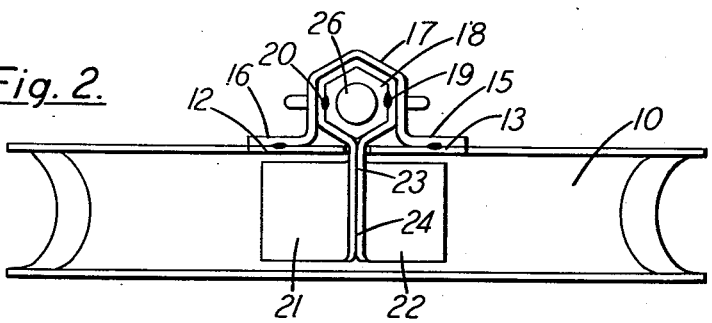
Fig. 2.
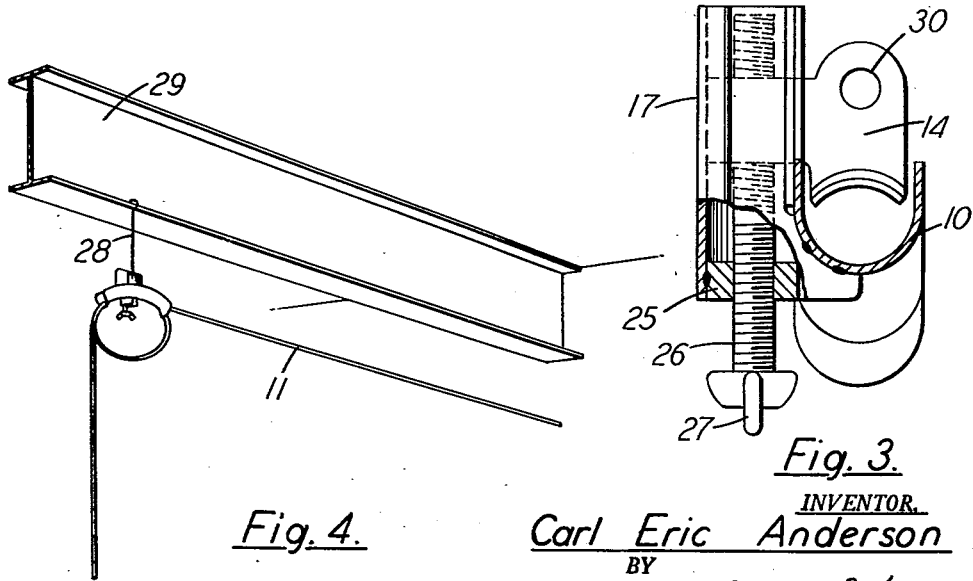
Fig. 3.
Fig. 4.
INVENTOR.
Carl Eric Anderson
BY
Attorney

United States Patent Office 2,810,538
Patented Oct. 22, 1957

2,810,538

DOUBLE-THREAD HANGER CLAMP

Carl Eric Anderson, Spring Lake, Mich.

Application January 8, 1954, Serial No. 402,980

3 Claims. (Cl. 248—63)

This invention relates to the construction of hanger clamps used for the suspension of wires and other lines from overhead structure. The necessity of occasionally changing the position of machines and equipment around a factory floor makes a system of permanent power outlets for each machine a rather expensive arrangement. As an alternative to this, it is possible to provide a relatively few strategically located power outlets which are connected to the several machines through temporary installations of wires suspended from the overhead structure of the building. Devices of the general type to which this invention is related are used to clamp the wire so that it can be effectively hung in position. The installation of such systems of suspended wire is ordinarily made by a workman standing on a ladder. Some degree of tension should be established in the wire so that undue sag does not interfere with the machines and working area at the floor. These requirements establish that the clamp should be easily adjustable with one hand, so that the worker will have his remaining hand free to handle the wire. In addition to this requirement, the number of these devices utilized in an extensive wiring system is such that the cost factor becomes important.

This invention provides a hanger clamp which is formed largely of sheet metal, so that the cost is reduced to a practical minimum while retaining the necessary characteristics relating to adjustability. The necessary clamping action is generated according to the present invention through relative movement between a line-receiving member and a clamping member, which are brought into clamping relationship through the action of a bolt and a double system of threads. One end of the bolt is threaded with opposite hand from the threads at the other end. One end of the bolt engages an internally-threaded member fixed with respect to the line-receiving member, and the opposite end of the bolt engages an internally-threaded member fixed with respect to the clamping member.

The several features of the present invention will be discussed in detail through an analysis of the particular embodiments illustrated in the accompanying drawing. In the drawing:

Figure 1 is a side elevation of a hanger clamp embodying this invention.

Figure 2 is a top view of the device shown in Figure 1.

Figure 3 is a section taken on the plane 3—3 of Figure 1.

Figure 4 is a view showing the installation of the device.

Referring to Figure 1, a trough 10 forms a line-receiving member in which a wire 11 (refer to Figure 4) may be positioned. One side of the trough 10 is extended as indicated at 12 and 13 to form a slot for receiving the portion 14 of a clamping member, and for the attachment of the flanges 15 and 16 of a covering plate having a channel-shaped central portion 17 which provides a passage for the movement of the inner end of the clamping member 14 in a direction parallel to the slot formed by the trough extensions 12 and 13. The lower extremities of the walls of the channel-shaped central portion 17 are shaped to extend underneath the trough 10 to provide support as shown at 31, and are preferably secured thereto by welding. The member 14 is preferably formed of sheet material which is wrapped around a standard nut 18 (refer to Figure 2) and spot welded thereto as indicated at 19 and 20. After being wrapped around the nut 18, the material is brought together to form the double thickness where it emerges from the slot separating the extensions 12 and 13. This double thickness of material is separated and turned laterally to form the clamping portions 21 and 22, the upper portions of the member 14 being spot welded together as at 23 and 24 to maintain rigidity.

A nut 25 of opposite-hand threads from that of the nut 18 is welded to the lower extremity of the covering plate 17, and both of these nuts are engaged by the bolt 26. The bolt 26 is therefore suspended between the two thread systems of opposite hand, and rotation of the bolt 26 through manipulation of the wing head 27 will result in twice as much displacement of the clamping member 14 with respect to the trough 10 as would take place if only one thread system of the same pitch were used. This arrangement provides a fast-opening action which is valuable as an aid to the workmen during the process of installation. The clamping unit is preferably suspended from a rod-shaped hanger 28 (refer to Figure 4) provided with a hook at the upper end which engages a suitable hole bored in the overhead girder 29. A similar hook preferably engages the hole 30 in the clamping member 14.

The particular embodiments of the present invention which have been illustrated and discussed herein are for illustrative purposes only, and are not to be considered as a limitation upon the scope of the appended claims. In these claims, it is my intent to claim the entire invention disclosed herein, except as I am limited by the prior art.

I claim:

1. A hanger clamp for the suspension of flexible lines, said clamp comprising: means forming a line-receiving trough; spaced extensions of a side of said trough forming a slot therebetween; a member having a channel-shaped central portion and oppositely-extending flanges integral with the opposite sides of said central portion, respectively, said flanges being respectively secured to said extensions, and said member being disposed with the axis thereof parallel to said slot; first nut means, said first nut means being embraced by and secured to said central portion; a clamping member having a portion slideably received in said slot and a clamping portion normally disposed above said line-receiving trough means, said clamping member also having a portion disposed within said channel-shaped central portion; second nut means, said second nut means being of opposite hand from said first nut means and being embraced by and secured to said clamping member portion disposed within said channel-shaped central portion; and bolt means having axially spaced and oppositely threaded portions engaging said first and second nut means, respectively, to induce relative movement between said clamping portion and said line-receiving trough means to generate clamping action.

2. A hanger clamp for the suspension of flexible lines, said clamp comprising: means forming a line-receiving trough; spaced coplanar extensions of a side of said trough forming a slot therebetween; a member having a channel-shaped central portion and oppositely-extending flanges integral with the opposite sides of said central portion, respectively, said flanges being respectively secured to said extensions, and said member being disposed with the axis thereof parallel to said slot; first nut means, said first nut means being embraced by and secured to said central portion; a clamping member having a portion slideably received in said slot and a clamping portion normally disposed above said line-receiving trough means, said clamping member also having a portion disposed within said channel-shaped central portion; second nut means, said second nut means being of opposite hand from said first nut means and being embraced by and secured to said clamping member portion disposed within said channel-shaped central portion; and bolt means having axially spaced and oppositely threaded portions engaging said first and second nut means, respectively, to induce relative movement between said clamping also having the lower extremities of the walls of said channel-shaped central portion extending under said line-receiving trough means to support the same; first nut means, said first nut means being embraced by and secured to said central portion; a clamping member having a portion slideably received in said slot and a clamping portion normally disposed above said line-receiving trough means, said clamping member also having a portion disposed within said channel-shaped central portion; second nut means, said second nut means being of opposite hand from said first nut means and being embraced by and secured to said clamping member portion disposed within said channel-shaped central portion; and bolt means having axially spaced and oppositely threaded portions engaging said first and second nut means, respectively, to induce relative movement between said clamping portion and said line-receiving